Patented May 21, 1929.

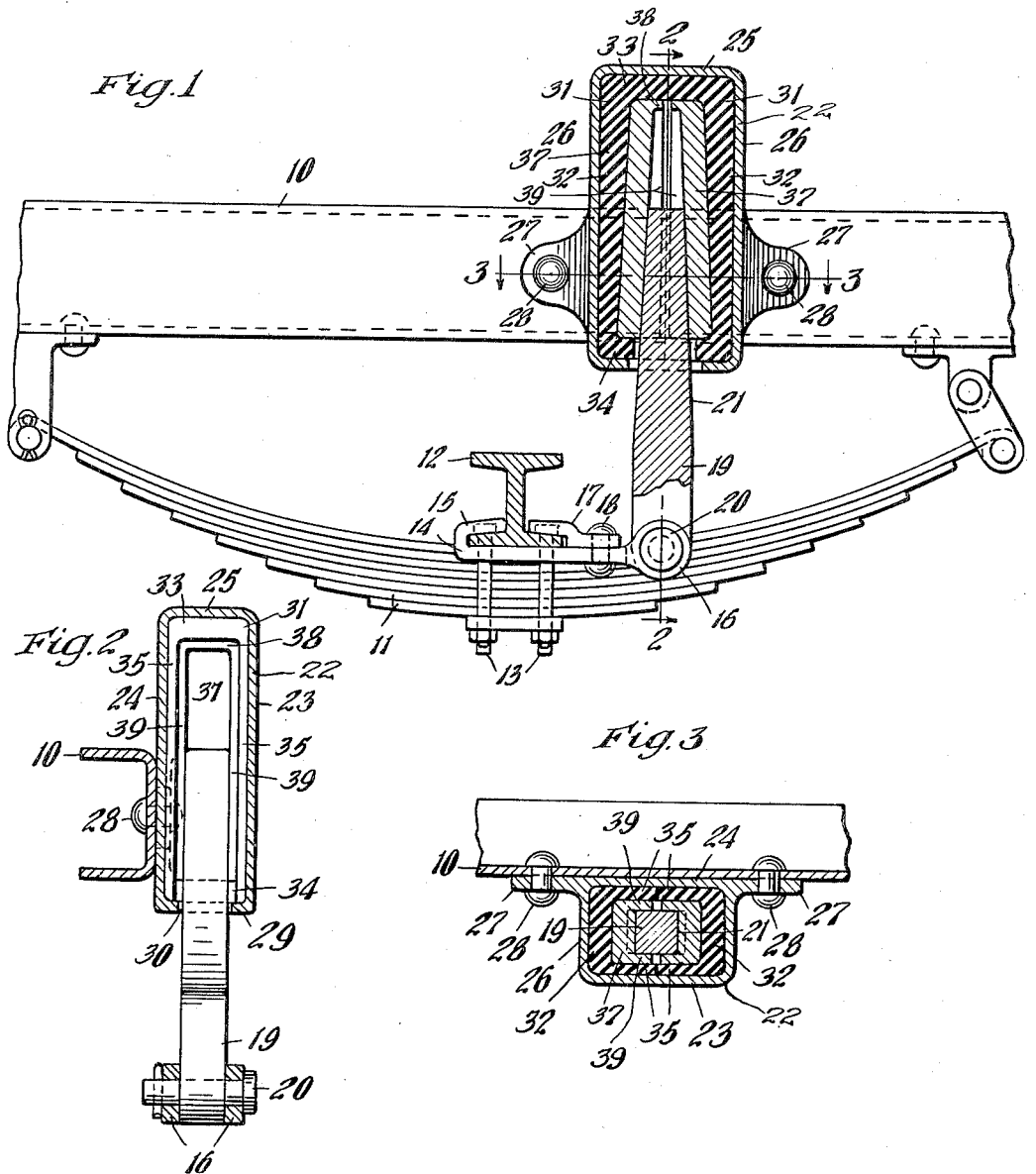

1,713,914

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM FOR AUTOMOBILES.

Application filed November 12, 1926. Serial No. 147,902.

This invention relates to shock absorbing mechanisms for automobiles.

An object of the invention is to provide a shock absorbing mechanism adapted for application to vehicles more particularly of the motor bus type, having the usual springs associated therewith, and wherein the shock absorbing mechanism is interposed between the frame member of the vehicle and axle, and operates in such manner as to supplement the action of the spring in absorbing the shocks transmitted thereto.

Another object of the invention is to provide a shock absorbing invention of the character referred to in which a plunger or actuating mechanism is connected to the axle so as to partake of the movements thereof, in conjunction with friction elements adapted to co-operate with the actuating element, which friction elements are carried by a casing secured to the frame member which latter contains live rubber under compression which surrounds the friction elements and urges the same into frictional engagement with the actuating element.

Other and further objects of the invention will more clearly appear from the description and claims hereinafter following.

In the drawings, forming part of this specification, Figure 1 is a side elevation of a fragment of an automobile chassis, and of the spring and axle, the latter being shown in section, and illustrating a vertical sectional view of the invention applied thereto. Figure 2 is a fragmentary transverse vertical sectional view of the invention substantially on the line 2—2 of Figure 1. And Figure 3 is a horizontal sectional view of the invention corresponding substantially to the line 3—3 of Figure 1.

As shown in the drawings, 10 represents a fragment of the side frame of the chassis of a vehicle, 11 denotes a spring assembly suitably secured to the frame member by shackles, and 12 denotes an I-beam which forms an axle of the vehicle which latter is connected to the spring assembly by a suitable bolt 13.

The invention includes a bracket comprising a plate like member 14 having a hooked end portion 15 adapted to be disposed over one of the lower flanges of the axle 12, the opposite end of the member 14 being provided with spaced ears 16 to permit pivotal connection thereof to an actuating member hereinafter referred to. The member 14 is secured in position by means of a plate 17 having an end portion fitting over the flange of the axle opposite to that engage by the hook portion 15, the plate 17 being riveted to the member 14 as indicated at 18. Disposed between the ears 16—16 upon the free end of the member 14 is one end of an actuating element 19, and the element 19 is pivotally connected between the ears 16—16 by means of a pivot pin 20. The actuating member 19 converges toward its free end as indicated at 21, the opposite sides thereof providing friction surfaces adapted to co-operate with the friction shoes hereinafter more fully referred to, mounted in a casing 22 which is carried by the frame member 10.

The casing 22 is provided with front, rear, top and end walls, 23, 24, 25, and 26—26, respectively, the end walls 26—26, and rear wall 23 being formed to provide projecting flanges or ears 27—27 through which are extended rivets indicated at 28 for securing the casing 22 to the frame 10. The casing is also provided with a bottom wall 29 having an aperture 30 therein through which the wedge element 19 projects, the aperture being of sufficient size to permit the required clearance for the wedge member during its operative movements. Disposed in the casing are two cushioning elements 31—31, each of which is formed of live rubber. Each of the cushioning members comprises a side portion 32 adapted to be disposed against the inner surface of one side wall 26 of the casing 22, said portion tapering in width from the top to the bottom, the thickest portion being disposed adjacent the top of the casing. The side portion is provided with upper and lower flanges 33 and 34, and side flanges 35—35, which together with the flanges 33 and 34, define a cavity or recess into which one of the friction shoes 37—37 fits. The members 31—31 are identically similar in construction except for their opposite disposition and when the same are arranged in the casing 22 provide a rubber cushion which practically surrounds the friction shoes 37—37. The friction shoes 37—37 are two in number, and one of the same is disposed upon each side of the wedge member 19 as best shown in Figure 1. Each of the friction members 37 is provided with a friction face adapted to engage the adjacent corresponding friction surface on the wedging element 19 and each of said shoes is provided with an upper flange 38 against which the end of the wedge member 19 may abut to limit its movement, while longitudinally extending flanges 39—39 are provided, which increase in width toward the bottoms of the shoe, and form a channel within which the wedge member 19 reciprocates. When the two shoes are in position upon opposite sides of the wedge element 19, the wedge is completely enclosed by the shoes which prevents any possibility of the wedge element coming into contact with the rubber which surrounds the shoes.

In operation, assuming movement of the axle and spring assembly toward the frame member 10, this movement will be transmitted to the wedge element 19 which due to its wedge surfaces separates the friction shoes 37—37. Spreading movement of the shoes 37—37 is resisted by the side portions 31 of the rubber pads, thereby causing yieldable frictional contact of the wedge shoes with the wedge surfaces of the wedge element 19, thereby retarding the inward movement of the wedge element, and assisting the spring assembly 11 in absorbing the shocks. During the inward movement of the wedge element 19, in addition to the lateral yieldable resistance of the rubber upon the friction shoes, the rubber which is interposed between the flanges 38—38 of the friction shoes and the top wall of the housing, yieldably resists the inward movement of the shoes which occurs when the wedge element 19 is reciprocated in an upward direction. Movement of the spring assembly 11 away from the frame member 10 retracts the wedge element 19 from its wedging position between the friction shoes and permits said shoes to resume their normal position, and it should be appreciated that downward movement of the friction shoes which occurs when the wedge element 19 is reciprocated downwardly, is yieldably resisted by the portions of rubber interposed between the lower ends of the friction shoes and the bottom wall 29 of the housing.

It is also pointed out that during relative approach or separation of the spring assembly 11 and the frame member 10, due to lengthening of the spring assembly, some slight lateral movement is imparted to the wedge element 19 which is pivotally carried by the axle secured to the spring assembly, but due to the arrangement of the friction shoes which are yieldably supported upon all sides by the rubber, the lateral movement of the element 19 is automatically compensated for by the yielding of the rubber, permitting the friction shoes to assume the required position.

In assembling the device the rubber pads are first inserted through the opening 30 in the bottom of the housing and then the friction shoes are likewise inserted through said opening and placed in the required position after which the wedge member 19 is secured to the axle, and the upper end inserted through the opening in the housing to engage the friction shoes, after which the casing or housing is secured to the frame member 10.

While I have herein shown and described what I consider the preferred manner of carrying out the invention, the same is merely illustrative, and I contemplate all changes and modifications which come within the scope of the claims appended hereto.

I claim:

1. In a shock absorbing device of the character described, the combination with relatively movable members; of a wedge element carried by one of said members; friction shoes associated with the other of said members and adapted to co-act with said wedge element; fixed means secured to said other element and disposed about said friction shoes and arranged in spaced relation with respect thereto; and cushioning material interposed between said fixed means and said shoes and bearing upon all sides of said shoes to maintain the same in position with respect to said wedge element and permit operative movements of the latter.

2. In a shock absorbing device of the character described, the combination with relatively movable members; of a wedge element connected to one of said members and partaking of the movement thereof; a casing carried by the other of said members; cushioning means within the casing; floating friction shoes embraced by said cushioning means and co-acting with said wedge element.

3. In a shock absorbing mechanism of the character described, the combination with relatively movable members; of a wedge element carried by one of said members, and movable in a longitudinal direction when said member moves relatively to the other member; friction shoes having friction surfaces adapted to co-act with the side surfaces of said wedge element, and having co-operating flanges at one set of ends; a casing having fixed walls disposed about said friction shoes; and cushioning pads interposed between the walls of said casing and the friction shoes, bearing on the sides, flanges and the ends of said shoes.

4. In a shock absorbing device of the character described, the combination with relatively movable members; of a wedge element carried by one of said members; friction shoes associated with the other of said members, said friction shoes being constructed to enclose a portion of said wedge element; a fixed casing secured to said other member; and cushioning elements interposed between the walls of said fixed casing and said friction shoes and surrounding said friction shoes on all sides and the top and bottom ends thereof.

5. In a shock absorbing device of the character described the combination with a frame member, and an axle member of a vehicle; of a housing secured to said frame member and provided with front, rear, side, and top walls, and a bottom wall having an opening therein; resilient material disposed in said housing and having portions engaging the various walls thereof, said resilient material being provided with a centrally disposed chamber; friction shoes arranged in said chamber; and a wedge member carried by said axle member, extending through the opening in the bottom wall of said housing, and frictionally engaging said friction shoes.

6. In a shock absorbing device of the character described, the combination with a frame member and axle member of a vehicle; of a wedge member pivotally carried by said axle member; of a housing secured to said frame member and provided with top, bottom, front, rear and side walls, said bottom wall being provided with an opening for the entrance of said wedge element; of friction shoes disposed about an end portion of said wedge element and enclosing the same, said friction shoes having friction surfaces disposed apart a greater distance at the lower ends than at their upper ends; and rubber interposed between the walls of said housing and all portions of said friction shoes, and bearing thereon to urge the same into engagement with said wedge element.

In witness that I claim the foregoing I have hereunto subscribed my name this 8th day of November 1926.

JOHN F. O'CONNOR.